United States Patent Office 2,737,595
Patented Mar. 6, 1956

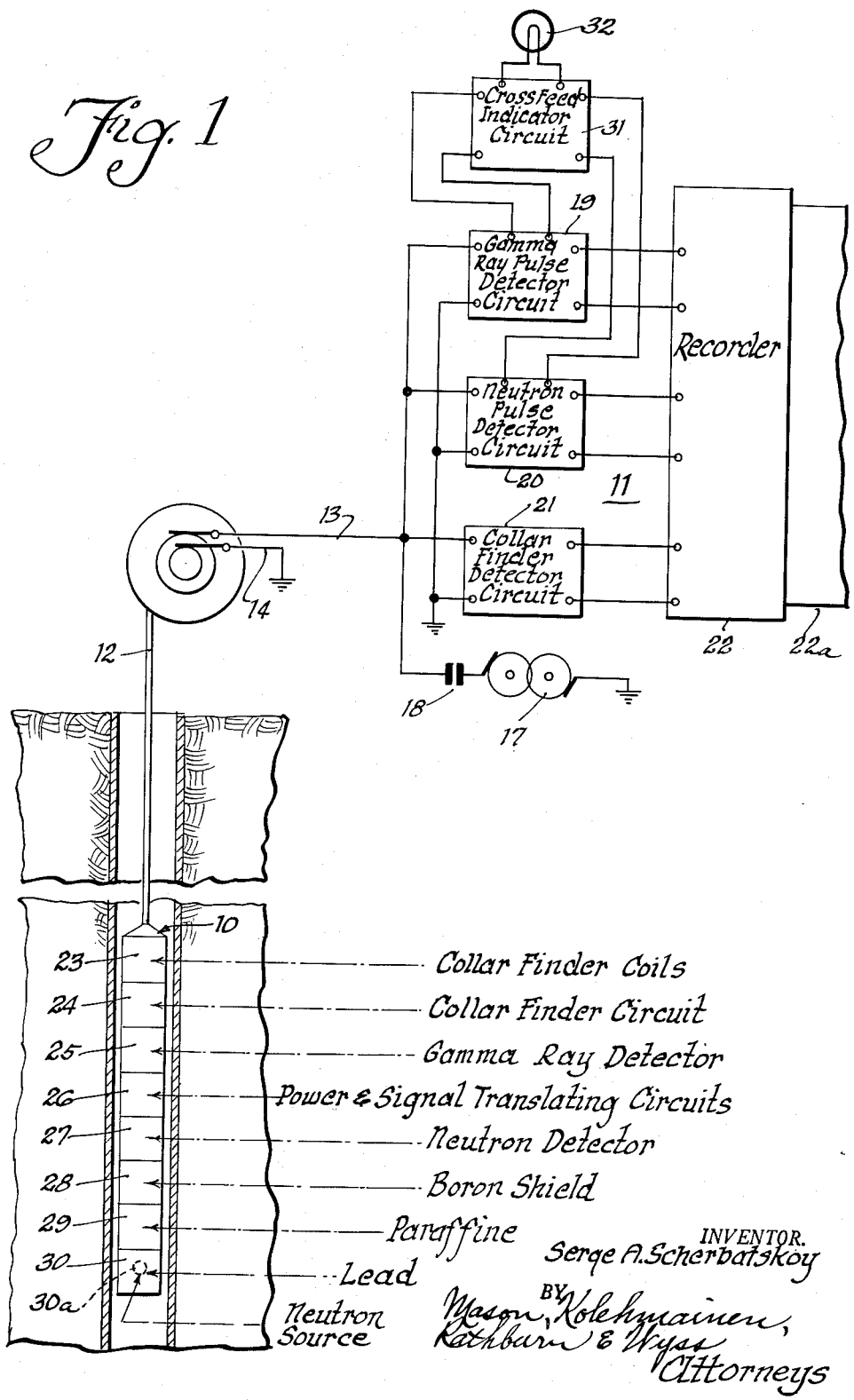

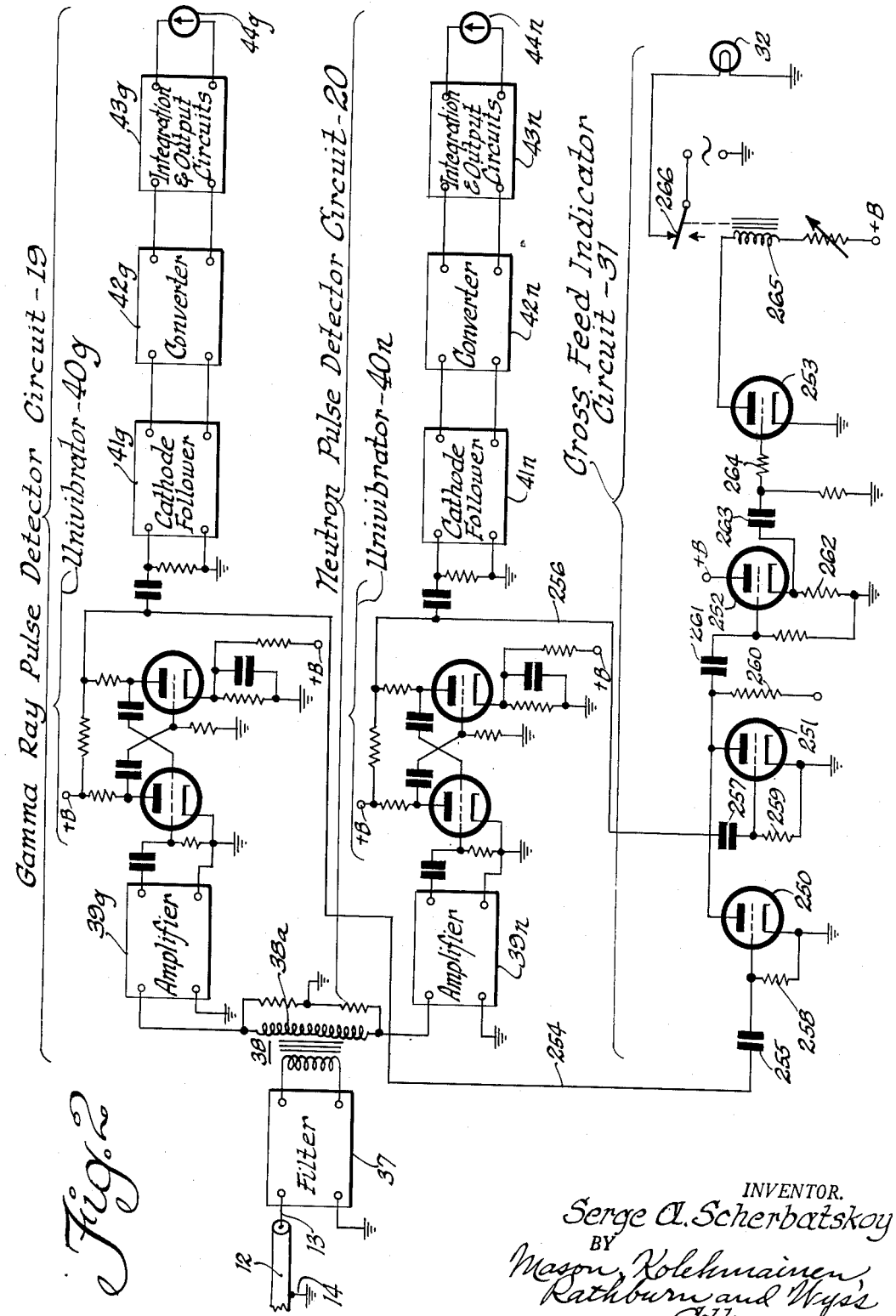

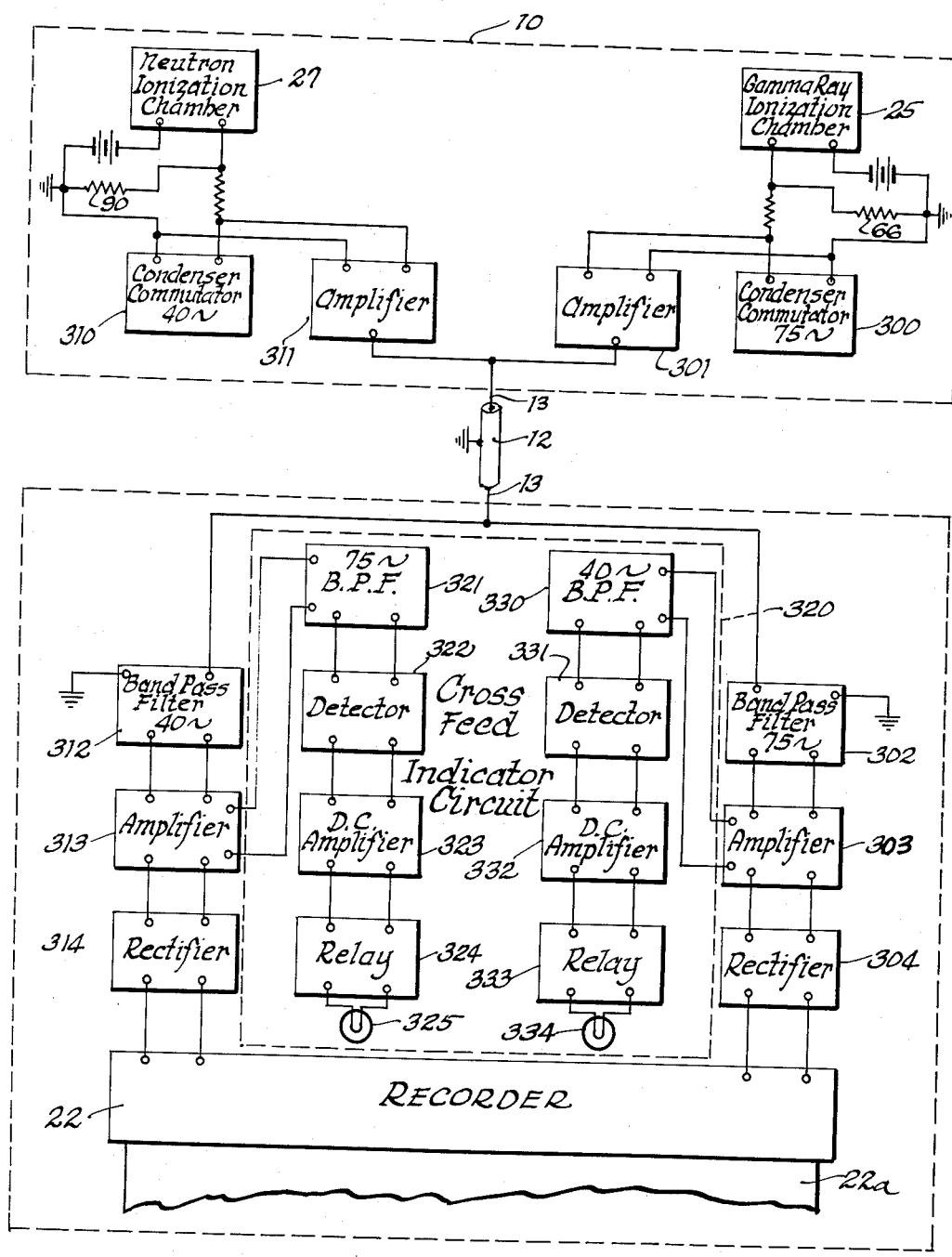

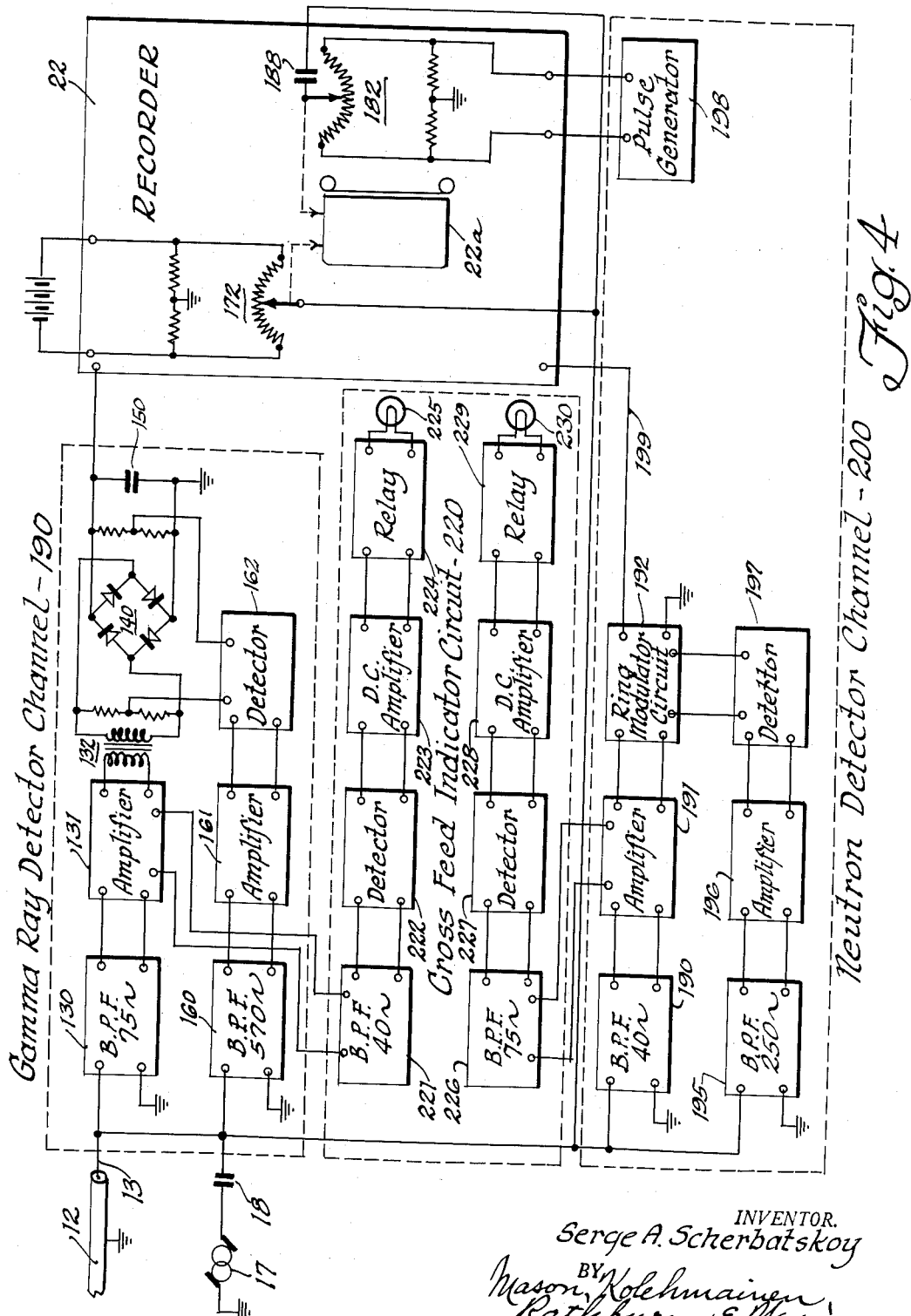

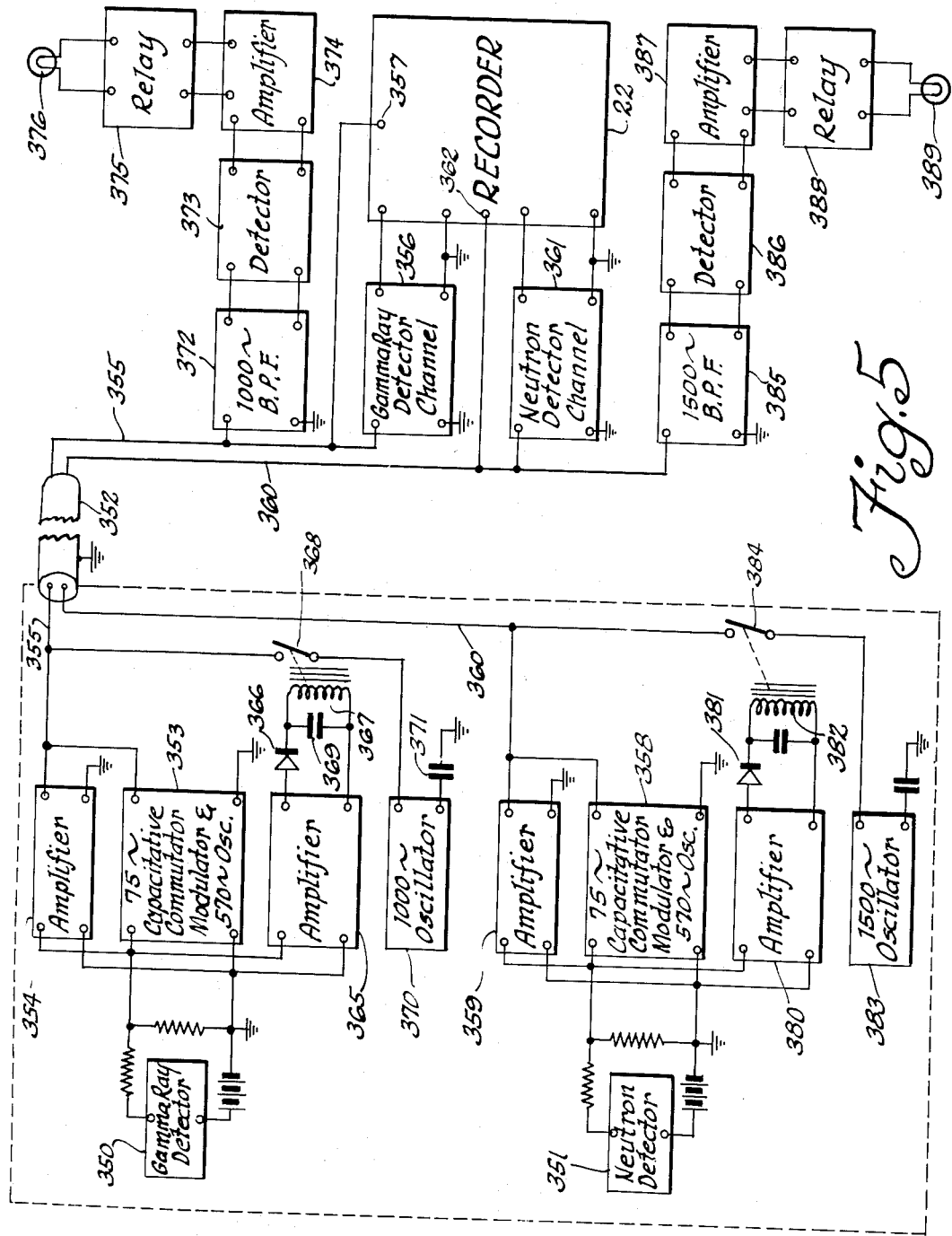

2,737,595

CROSS FEED INDICATOR FOR SIMULTANEOUS RADIOACTIVITY WELL LOGGING SYSTEM

Serge A. Scherbatskoy, Tulsa, Okla.

Application November 8, 1952, Serial No. 319,513

17 Claims. (Cl. 250—83.6)

The present invention relates to radioactivity well logging, and, more particularly, to a radioactivity well logging system for simultaneously obtaining logs of different types of radiation.

In the art of radioactivity well logging, it is sometimes necessary to combine a log of one type of radiation with a log of a different type of radiation. For example, it is sometimes desirable to combine a log of the natural gamma ray activity in the borehole with a neutron log in order that the stratigraphy and possible pay zones may be accurately correlated. In such situations, it is extremely desirable to produce both logs simultaneously so that correlated gamma ray and neutron information is obtained in a single operation. It is also desirable to employ only a single conductor armored cable to perform this simultaneous well logging operation, since such a cable is easy to handle, is inexpensive and may be constructed to withstand the weight of many thousands of feet of its own length.

In simultaneous well logging systems of the above-described type, it is customary to provide separate signal transmission channels for each type of signal so that separate and distinct logs of each type of radiation may be made. When a single conductor cable is employed, signal channel separation may be on an amplitude, polarity or width basis if the signals are of the pulse type, or the signal channel separation may be on a frequency basis if continuous wave signals are employed. If a multi-conductor cable is employed, signal channel separation may be obtained by assigning different channels to different conductors of the cable. In all of these simultaneous systems there arises the problem of preventing signal cross-feed between the different signal channels of the system and it will be readily apparent that if signals representing two different types or kinds of radiation are transmitted over one of the signal transmission channels an erroneous log will be obtained. Furthermore, the error may go unnoticed for a considerable time since there is no way for the operator of the equipment to determine whether such a condition exists. As a result, a considerable amount of time and money may be expended in obtaining erroneous logs before the error is corrected, and it will be extremely desirable to provide some means for indicating when cross feed occurs between the signal transmission channels of a simultaneous well logging system.

Accordingly, it is an object of the present invention to provide a new and improved radioactivity well logging system for simultaneously producing logs of different types of radiation wherein there is provided means for detecting signal cross feed between the signal transmission channels of the system.

It is another object of the present invention to provide a new and improved radioactivity well logging system for simultaneously producing logs of different types of radiation wherein the transmission of signals representing two types of radiation over a single signal transmission channel of the system is indicated to the operator.

The invention, both as to its organization and method of operation, together with further objects and advantages thereof, will best be understood by reference to the following specification taken in connection with the accompanying drawings, in which:

Fig. 1 diagrammatically illustrates a combined neutron gamma ray and collar position logging apparatus characterized by the features of the present invention;

Fig. 2 schematically illustrates the surface equipment of the logging apparatus of Fig. 1;

Fig. 3 schematically illustrates a different logging apparatus embodying the features of the present invention;

Fig. 4 schematically illustrates another logging apparatus embodying the features of the present invention; and Fig. 5 schematically illustrates still another logging apparatus embodying the features of the present invention.

Referring now to the drawings and, more particularly, to Fig. 1 thereof, the simultaneous neutron, gamma ray and collar position logging apparatus there illustrated generally comprises a subsurface unit 10 and a surface unit 11 interconnected by means of a single conductor armored cable 12.

In general, the subsurface equipment 10 comprises the collar finder coils 23, a collar finder circuit 24, a detector of natural gamma rays 25, power and signal translating circuits 26, a neutron detector 27, a boron shield 28, a paraffin spacer 29 and a mass of lead 30 within which there is positioned a suitable neutron source 30a. The component units 23 to 30, inclusive, are housed within a shielded housing having the requisite physical strength to withstand the fluid pressures encountered and are preferably positioned in the housing in the particular order illustrated. The unit 10 is arranged to be lowered into the borehole by means of the cable 12 which is preferably of the coaxial type and comprises a center conductor 13 surrounded by, and insulated from, an armored sheath 14. This sheath is appropriately grounded at the earth's surface and an alternating current generator 17, forming a part of the surface equipment 11 and coupled to the conductor 13 through the blocking condenser 18, is utilized to supply power over the cable 12 to the subsurface unit 10.

Generally considered, the surface equipment 11 comprises a gamma ray pulse detector circuit 19, a neutron pulse detector circuit 20, a collar finder detector circuit 21, a recorder 22, which is preferably of the commercial type known as the Speed-O-Max, manufactured by the Leeds and Northrop Company of Philadelphia, Pennsylvania, and a cross feed indicator circuit 31. The output circuits of the units 19, 20 and 21 are connected to the recording instrument 22 which operates to produce on the record strip 22a a continuous graph of both the neutron and gamma ray signals transmitted to the equipment 11 from the subsurface equipment 10 and also responds to the signals supplied by the detector circuit 21 to produce indications on the strip 22a identifying the positions of casing collars within the cased borehole so that a correlated neutron, gamma ray and depth measurement log is obtained. The gamma ray pulse detector circuit 19 and the neutron pulse detector circuit 20 are also connected to the cross feed indicator ciruit 31 which is provided with an indicator lamp 32 to inform the operator that signal cross feed between the circuits 19 and 20 is taking place.

In considering the subsurface unit 10, it is pointed out that this unit may be identical to the corresponding subsurface unit shown in my co-pending application Serial No. 205,616, filed January 12, 1951, and assigned to the same assignee of the present invention, and reference may be had to this co-pending application for a detailed description of this subsurface unit. However, for the purposes of the present invention, it will be understood that the neutron source 30a emits neutrons which pass through the surrounding formations. Neutrons which are slowed down in the formations or are produced by nuclear reactions within the formations are intercepted by the neutron detector 27 and cause ionization thereof. In this embodiment, the neutron detector 27 is of the pulse type and is provided with suitable means to respond to the intercepted neutrons so that the detector 27 produces pulses of a given polarity in the output circuit thereof, the rate of occurrence of which is proportional to the intensity of the neutron radiation intercepted by the detector 27.

The gamma ray detector 25, which is also of the pulse producing type and is preferably spaced a substantial distance away from the neutron source 30a so as to be substantially unaffected by any gamma rays emitted by this source, or gamma rays of capture produced in the formations as a result of bombardment by the source 30a, responds to natural gamma rays emitted by the formations by producing pulses, the rate of occurrence of which is proportional to the natural gamma ray activity adjacent the detector 25. The neutron detector pulses produced in the neutron detector 27 are supplied to the power and signal translating circuits 26 wherein these pulses are amplified and standardized in amplitude and width and are supplied as neutron pulses of a predetermined polarity to the center conductor 13 of the cable 12 for transmission to the surface equipment 11. The gamma ray detector pulses produced in the detector 25 are also supplied to the power and signal translating circuits 26 wherein these pulses are amplified and are standardized in amplitude and width and are supplied as pulses of the opposite polarity to the center conductor 13 of the cable 12 for transmission to the surface equipment 11. Accordingly, neutron pulses of one polarity and gamma ray pulses of the opposite polarity are transmitted over the cable 12 to the earth's surface and it will be evident that this cable constitutes, in effect, a common source of pulses representing radiation of two different types. In this connection, it will be understood that any other suitable subsurface equipment may be employed to impress pulse signals representing different types of radiation on the common cable 12 insofar as the present invention is concerned.

Referring now to the surface equipment 11, and more particularly to the component units 19, 20, 31 and 32 thereof, which are shown in detail in Fig. 2 of the drawings, the pulse signals which are transmitted over the cable 12 from the subsurface unit 10 are impressed upon a filter 37, the output of which is connected to a coupling transformer 38. The transformer 38 is provided with a secondary winding 38a, one end of which is connected to an amplifier 39g in the gamma ray pulse detector circuit 19, and the other end of which is connected to an amplifier 39n in the neutron pulse detector circuit 20. The output of the amplifier 39g is connected to a univibrator 40g, the output of which is connected through a cathode follower 41g and a converter 42g to the integration and output circuits 43g. In a similar manner, the ouput of the amplifier 39n is connected to a univibrator 40n, the output of which is connected through a cathode follower 41n and a converter 42n to the integration and output circuits 43n.

The system components 19, 20, 37 and 38 may all be identical to the corresponding system components shown and described in detail in my co-pending application Serial No. 205,616, identified above, and reference may be had to this co-pending application for a detailed description thereof. However, for the purposes of the present invention, it may be stated that the amplifier 39g is provided with a suitable amplitude selection circuit to select only the gamma ray pulses appearing across the secondary 38a of the transformer 38 and to prevent neutron pulses of the opposite polarity appearing across the winding 38a from being transmitted through the gamma ray pulse detector circuit 19. The gamma ray pulses selected in the amplifier 39g are impressed upon the univibrator 40g which responds to these pulses by producing corresponding pulses of uniform amplitude and duration. These uniform amplitude pulses are coupled through the cathode follower 41g to the converter 42g wherein they are rectified and an output signal which is proportional to the rate of occurrence of the pulses is produced. This output signal is then integrated in the circuits 43g so as to provide a substantial unidirectional voltage which may then be impressed upon the indicating meter 44g to indicate the gamma ray activity in the borehole. The output circuits 43g are also connected to one of the input circuits of the recorder 22 so as to provide a gamma ray log.

In a similar manner, the amplifier 39n is provided with a suitable amplitude selection circuit so that only the neutron pulses appearing across the winding 38a are selected and the gamma ray pulses of the opposite polarity are prevented from being transmitted through the amplifier 39n. The output of the amplifier 39n is coupled to the univibrator 40n which responds by producing corresponding pulses of uniform amplitude and duration and these pulses are coupled through the cathode follower 41n to the converter 42n. The converter 42n rectifies the standardized neutron pulses so that another output signal, which is proportional to the rate of occurrence of the neutron pulses, is produced and this output signal is integrated in the circuits 43n and impressed upon the meter 44n and the recorder 22.

It will thus be evident from the foregoing general description that the detector circuits 19 and 20 operate to separate the gamma ray pulses of one polarity from the neutron pulses of the opposite polarity and the separated pulses are then separately detected and impressed upon the recorder 22. When the gamma ray and neutron pulses are impressed upon the cable 12 in the subsurface unit 10 and are transmitted over the cable 12, through the filter 37 and through the transformer 38, these pulses are modified in wave shape so that the pulses are no longer purely unidirectional pulses, but instead, may inlude some overshoot portions of the wrong polarity. These overshoot portions are of the same polarity as the opposite type of pulse and hence, may be accepted by the opposite detector circuit if the amplitude selection level in the detector circuits is improperly adjusted. For example, if the amplitude selection circuit in the amplifier 39g is improperly adjusted, the overshoot portions of the neutron pulses appearing across the winding 38a may be transmitted through the amplifier 39g and cause the univibrator 40g to respond thereto so that an inaccurate output signal is derived at the output terminals on the detector circuit 19. In a similar manner, if the amplifier 39n is improperly adjusted, the overshoot pulses of gamma ray pulses may cause a false response in the neutron detector circuit 20. It will also be understood that such cross feed of pulses from one detector circuit to the other is not detectable by the operator of the apparatus since, with conventional equipment, he has no way to determine what type of pulses are actually causing a response in the output circuit of each detector circuit. Furthermore, even though the amplitude selection level of the amplifiers 39g and 39n is initially adjusted so that no cross feed occurs, when the instrument is placed in the borehole and is subjected to the extreme temperatures and pressure encountered therein, changes in the detector output, pulse waveform, et cetera, may occur which result in signal cross feed.

In order to provide an indication of cross feed between the gamma ray and neutron signal transmission channel so that maximum gain may be employed without producing cross feed, there is provided, in accordance with the present invention, the cross feed indicator circuit 31. This circuit comprises a pair of coincidence tubes 250 and 251, a cathode follower tube 252 and a relay control tube 253. Standardized gamma ray pulses which are produced by the univibrator 40g in the gamma ray pulse detector circuit 19 are transmitted over the conductor 254 and through the condenser 255 to the control grid of the coincidence tube 250. In a similar manner, the standardized neutron pulses which are produced by the univibrator 40n are transmitted over the conductor 256 and are coupled through the condenser 257 to the control grid of the coincidence tube 251. The cathodes of the tubes 250 and 251 are connected to ground and these tubes are provided with the grid resistors 258 and 259, respectively, so that the tubes 250 and 251 are normally operated at zero bias and are, hence, normally fully conductive. The anodes of the tubes 250 and 251 are connected together and through the common anode resistor 260 to a suitable positive source of anode potential. Accordingly, the tubes 250 and 251 are normally heavily conductive so that the anode potential of these tubes is at a relatively low value, preferably in the order of two or three volts. When negative pulses are impressed upon the control grid of one of the tubes 250 or 251, the tube is driven beyond cut-off so that it ceases to draw current through the common anode resistor 260. If only one of the coincidence tubes is turned off and the other tube remains heavily conductive, the anode potential of these tubes does not rise appreciably since the remaining conductive tube is of relatively low resistance and operates to hold the anode potential down. However, if the negative pulses impressed upon the control grids of the tubes 250 and 251 coincide so that both tubes are turned off simultaneously, then the anode potential rises to a relatively high positive value and remains at this value for the duration of the simultaneous pulses impressed upon the control grids of the tubes 250 and 251. Accordingly, there is produced across the common anode resistor 260 a positive pulse each time the signals impressed upon the control grids of the tubes 250 and 251 coincide. The pulses produced across the resistor 260 are coupled through the condenser 261 to the control grid of the tube 252, wherein they are repeated in like phase across the cathode resistor 262 of the tube 252. These positive pulses are coupled through the condenser 263 and the series grid resistor 264 to the control grid of the relay control tube 253. In the anode circuit of the tube 253 there is provided a relay 265 having the contacts 266 which are connected from one side of an alternating current source to one side of the indicator lamp 32, the other sides of the alternating current source and the lamp 32 being connected to ground to complete the indicator lamp circuit. The tube 253 is normally operated at zero bias so that the relay 265 is energized from the positive anode potential source and the contacts 266 are open. However, when current through the tube 253 decreases, the relay 265 is deenergized and the contacts 266 are closed so as to light the indicator lamp 32.

When the pulses impressed upon the control grids of the tubes 250 and 251 coincide, a positive pulse is produced across the resistor 260 which is repeated through the tube 252 and the positive pulse produced at the cathode of the tube 252 is coupled to the control grid of the relay control tube 253. The tube 253 is normally operated at zero bias and the positive pulse from the tube 252 tends to drive the grid of the tube 253 more positive so that grid current flows in the control grid circuit of the tube 253 and the condenser 263 is charged negatively due to this flow of grid current. When the pulse on the grid of the tube 253 disappears, the negative charge developed on the condenser 263 biases the tube 253 beyond cut-off so that the relay 265 is deenergized and the contacts 266 thereof are closed so that the lamp 32 is energized. The condenser 263 holds the tube 253 beyond cut-off for the period of time required for the charge on this condenser to leak off through the associated grid resistors so that a relatively narrow positive pulse impressed upon the control grid of the tube 253 operates to decrease the current in the tube 253 for a substantial period of time. With this arrangement, an effective pulse stretching action is obtained so that with relatively narrow pulses, which are spaced relatively far apart, an appreciable change in the average current through the tube 253 is provided so as to actuate the relay 265. However, it will be understood that any other suitable arrangement for controlling the tube 253 in accordance with the pulses developed by the coincidence tubes 250 and 251 may be employed. It will also be noted that the cathode follower tube 252 is provided for the purpose of producing relatively high power positive pulses across the cathode resistor 262 thereof and a low impedance driving source for the grid circuit of the tube 253 is thereby provided. It will be understood that the relay 265 has a minimum or drop-out current above which it remains energized so that a predetermined amount of cross feed between the detector circuits 19 and 20 must occur before the lamp 32 is energized. However, it will be understood that the tubes 250 to 253, inclusive, and the associated circuit constants may be so designed that a predetermined amount of cross feed between the circuits 19 and 20 produces energization of the lamp 32. It will also be understood from the foregoing description that the cross feed indicator circuit 31 immediately advises the operator when a predetermined amount of cross feed between the circuits 19 and 20 occurs. Furthermore, this indication is made irrespective of the source of the cross feed. Thus, either the subsurface unit 10, the cable 12, the filter 37, the transformer 38 or the amplifiers 39g and 39n may set up a condition of cross feed between channels, in which case, such cross feed is indicated by the circuit 31. It will also be noted that the pulses which are impressed upon the coincidence tubes 250 and 251 are derived from the output circuits of the univibrators 40g and 40n. These pulses are of uniform amplitude and duration so that an accurate indication of coincidence between the pulses in each channel is made possible. However, it will be understood that the pulses impressed upon the coincidence tubes 250 and 251 may be derived from any other suitable point in the system which will provide an accurate indication of the coincident occurrence of pulses in both signal transmission channels. It will also be understood that the cross feed indicator system of the present invention may be employed in other simultaneous well logging systems of the pulse transmission type. For example, if signal channel separation is provided on a pulse width basis, a suitable pulse width coincidence circuit may be employed to detect signal cross feed, as will be well understood by those skilled in the art.

The cross feed indicator circuit of the present invention may also be employed with other types of well logging systems. For example, in Fig. 3, there is illustrated a well logging system of the type shown and described in detail in my co-pending application, Serial No. 235,300, filed July 5, 1951, which is assigned to the same assignee as the present invention. While reference may be had to this co-pending application for a detailed description of the system shown in Fig. 3, for the purposes of the present invention it may be stated that the subsurface unit 10 comprises a gamma ray detector 25 of the ionization chamber type having an output resistor 66, and a neutron detector 27 of the ionization chamber type having an output resistor 90. The unidirectional signal produced across the resistor 66 is converted into an alternating current signal by means of the 75-cycle condenser commutator 300 and the alternating current signal is amplified in the amplifier 301 and impressed upon the center conductor 13 of the cable 12. In a similar manner, the signal produced across the resistor 90 is converted into an alternating current signal of different frequency by means of the 40-cycle condenser commutator 310 and this alternating current signal is amplified in the amplifier 311 and impressed upon the conductor 13 of the cable 12. At the earth's surface the 40-cycle signal derived from the neutron detector 27 is separated from the other signals of the system in the band pass filter 312, the output of which is coupled through the amplifier 313 to the rectifier 314 and the output of the rectifier 314 is impressed upon one set of input terminals of the recorder 22. The 75-cycle signal derived from the gamma ray detector 25 is separated in the band pass filter 302, is amplified in the amplifier 303 and rectified in the rectifier 304, the output of the rectifier 304 being impressed upon a different set of input terminals of the recorder 22. With the system described thus far, gamma ray signals produced by the detector 25 and neutron signals produced by the detector 27 are both transmitted over the single conductor cable 12 to the earth's surface, at which point, they are separated from each other and the remaining signals of the system and impressed upon the recorder 22 so as to provide correlated gamma ray and neutron logs. In this connection, it will be understood that a suitable power source, such as the source 17 (Fig. 1) may be employed to energize the subsurface unit 10 of Fig. 3 and a collar finder circuit (not shown) may be employed in the system shown in Fig. 3, if desired.

In the system of Fig. 3, a cross feed indicator circuit 320 is provided in the surface equipment. This indicator circuit includes a 75-cycle band pass filter 321 which is connected to the output of the amplifier 313. A detector 322 is connected to the output of the filter 321 and a D. C. amplifier 323 is connected to the output of the detector 322. The amplifier 323 is used to energize a relay 324 which controls the energization of an indicator lamp 325. In a similar manner, there is provided a 40-cycle band pass filter 330 which is connected to the output of the amplifier 303 and a detector 331 is connected to the output of the band pass filter 330. The output of the detector 331 feeds a D. C. amplifier 332 which, in turn, energizes a relay 333 which controls an indicator lamp 334. The circuit elements 321 and 325, inclusive, and 330 to 334, inclusive, may all be of conventional well-known construction and, hence, a detailed description thereof is considered unnecessary herein.

In the system shown in Fig. 3, cross feed between the signal transmission channels may occur for any one of a number of reasons. Thus, in the subsurface unit 10, the condenser commutators 300 and 310 may experience a frequency shift due to temperature or voltage changes, the condenser commutators 300 and 310 may generate harmonics which will be picked up by the opposite channel, and intermodulation components between the signals of the two condenser commutators, which may be due to non-linear amplifiers or the like, will produce cross feed between channels. Additionally, noise impulses developed in any of the components in the subsurface unit 10 may operate to produce cross modulation between the channels. In the surface equipment a shift in the frequency of the signals transmitted by the subsurface unit 10 will produce corresponding changes in the output of the band pass filters of the system since the frequency characteristics of these band pass filters necessarily overlap. Thus, the amount of 40-cycle signal passed by the 75-cycle band pass filter 302 will vary if the frequency of the condenser commutators in the subsurface unit 10 changes with temperature, voltage or circuit constants. In addition, intermodulation between the signals transmitted over the single conductor cable 12 may arise due to the common path provided for both types of signals. If a multiconductor cable is employed so that the gamma ray and neutron signals are transmitted over different conductors to the earth's surface, cross feed may still arise between signal transmission channels due to the capacitative coupling between the conductors of the multi-conductor cable, it being understood that this capacitative coupling is substantial when a multi-conductor cable several thousand feet in length is employed.

Considering now the operation of the cross feed indicator circuit 320 in the system shown in Fig. 3, a portion of the 75-cycle gamma ray signal may be coupled into the neutron channel due to any of the above discussed causes. If such a condition occurs, the 75-cycle signal appearing in the output of the amplifier 313 is passed by the filter 321 and is detected in the detector 322. The detected signal produced in the output circuit of the detector 322 is amplified in the D. C. amplifier 323 and applied to the relay 324 so as to cause energization of this relay and, hence, energization of the lamp 325. Accordingly, the operator is informed by means of the lamp 325 that a portion of the gamma ray signal is being coupled into the neutron detector channel and is giving a false indication in this channel.

In a similar manner, if a portion of the 40-cycle neutron signal is coupled into the gamma ray detector channel, the 40-cycle signal present in the output of the amplifier 303 is passed by the filter 330 and detected in the detector 331 and this detected signal is amplified in the amplifier 332 so as to energize the relay 333 and light the indicator lamp 334. Accordingly, the operator is informed by means of the lamp 334 that cross feed from the neutron channel to the gamma ray detector channel is taking place.

The cross feed indicator circuit of the present invention may also be applied to another type of well logging system such as shown and described in detail in my co-pending application, Serial No. 235,300, identified above, the surface equipment of which is shown in Fig. 4 of the drawings. While reference may be had to this co-pending application for a detailed description of this well logging system, for the purposes of the present invention it may be stated that the well logging system shown in Fig. 4 is similar to the system described above in connection with Fig. 3, with the addition of slide wire potentiometer circuits and feed-back paths to the subsurface unit so that a pair of servo or follow-up systems are provided wherein a reference signal of fixed phase is transmitted to the earth's surface along with each alternating current detector signal, and a unidirectional, alternating current, or pulse type feedback signal is transmitted from the earth's surface to the subsurface unit to balance or match the detector output so as to bring the system to a null or balance point. Accordingly, in the system of Fig. 4, the single conductor cable 12 transmits to the earth's surface a commutated 75-cycle gamma ray error signal, a modulated 570-cycle gamma ray reference signal, a commutated 40-cycle neutron error signal, a modulated 250-cycle neutron reference signal and a collar locating signal. This cable also transmits from the earth's surface to the subsurface unit a power signal from the generator 17, a unidirectional feedback signal derived from the arm of the gamma ray slide wire potentiometer and a pulse signal derived from the neutron slide wire potentiometer 182 which is energized from the pulse generator 198.

In order to separate the various signals appearing on the cable 12 at the earth's surface so that the gamma ray and neutron signals may be separately detected and recorded, there is provided a gamma ray detector channel 190 and the neutron detector channel 200. More specifically, the gamma ray detector channel 190 comprises a 75-cycle band pass filter 130, an amplifier 131, a 570-cycle band pass filter 160, an amplifier 161, a detector 162 and a ring modulator circuit 140. The 75-cycle gamma ray error signal is separated in the filter 130 and is amplified in the amplifier 131 and coupled through the transformer 132 to the ring modulator circuit 140. The 570-cycle carrier wave, on which is modulated the 75-cycle gamma ray reference signal, is separated from the other signals of the system in the filter 160 and is amplified in the filter 161 and is impressed upon the detector 162. The detector 162 demodulates the carrier wave so as to derive a fixed phase 75-cycle reference signal which is also impressed upon the ring modulator circuit 140. Accordingly, an output signal is produced across the output condenser 150 of the circuit 140 whenever an error signal is produced on the cable 12. The signal produced across the condenser 150 is impressed upon one of the input terminals of the recorder 22 and is employed to shift the arm of the potentiometer 172 until the error signal disappears, at which time the gamma ray follow-up system is at a null or balance point. In a similar manner, the neutron detector channel 200 comprises a 40-cycle band pass filter 190, an amplifier 191, a 250-cycle band pass filter 195, an amplifier 196, a detector 197 and a ring modulator circuit 192. The filter 190 separates the 40-cycle neutron error signal which is amplified in the amplifier 191 and impressed upon the ring modulator circuit 192. The filter 195 separates the 250-cycle carrier wave, on which is modulated the 40-cycle neutron reference signal, and the separated carrier wave is amplified in the amplifier 196 and detected in the detector 197, the 40-cycle reference signal being impressed upon the ring modulator circuit 192. The output of the modulator circuit 192 is transmitted over the conductor 199 to another input terminal of the recorder 22 wherein this signal is employed to adjust the arm of the potentiometer 182 until the neutron error signal disappears, at which time, the neutron follow-up system is at a null or balance point. It will be understood that a suitable collar finder detector circuit, which is not shown in Fig. 4, may be employed in the surface equipment to detect and record the location of casing collars simultaneously with the production of gamma ray and neutron logs.

In order to provide an indication of cross feed between the gamma ray and neutron detector channels 190 and 200, which may arise due to any one of the above-described causes, there is provided a cross feed indicator circuit 220. The circuit 220 comprises a 40-cycle band pass filter 221 which is connected to the output of the amplifier 131, a detector 222, a D. C. amplifier 223, a relay 224 and an indicator lamp 225. The indicator circuit 220 further comprises a 75-cycle band pass filter 226 which is connected to the output of the amplifier 191, a detector 227, a D. C. amplifier 228, a relay 229 and an indicator lamp 230. The indicator circuit 220 operates in substantially the same manner as the indicator circuit 320, described in detail above, so that cross feed between channels is indicated by energization of the lamps 225 and 230. Thus, if a 40-cycle signal is present in the output of the amplifier 131, this signal is passed by the filter 221, is detected by the detector 222, is amplified by the amplifier 223 and impressed upon the relay 224 so as to energize the lamp 225 and inform the operator that cross feed into the detector channel 190 is taking place. In a similar manner, the filter 226 responds to a 75-cycle signal in the output of the amplifier 191 so as to energize the lamp 230 and inform the operator that cross feed into the detector channel 200 is occurring.

If desired, additional cross feed channels may be employed in conjunction with the 570-cycle amplifier 161 and the 250-cycle amplifier 196 so that cross feed between any two of the closely related frequency selective channels of the system is provided. Also, it will be understood that a single indicator lamp may be employed in conjunction with the relays of all of the cross feed indicator channels to indicate to the operator whenever signal cross feed at any point in the system is occurring. It will also be understood that in the system of Fig. 4 a multi-conductor cable may be employed wherein the error signals and reference signals may be transmitted over separate conductors, together with the associated feedback signal. With a system of this type, the cross feed indicator circuits described above may be employed in conjunction with the different amplifiers of the system to provide an indication of cross feed between channels. In this connection, it will be understood that even though separate conductors are employed for transmission of signals representing different types of radiation, cross feed may occur due to the capacitive coupling between the conductors in the cable 12, as well as any other common signal transmission components of the system.

In the event that a multi-conductor cable system is employed wherein the different types of radiation signals are of the same frequency so that separation of signals on a frequency basis is impossible, the cross feed indicator system shown in Fig. 5 may be employed. In the system shown in Fig. 5 the signals produced by the gamma ray detector 350 and the neutron detector 351 are converted into alternating current signals of the same frequency which are transmitted over different conductors of the cable 352 to the earth's surface wherein the signals are employed to operate the recorder 22. Thus, the signal produced by the gamma ray detector 350 is converted into a 75-cycle alternating current error signal in the unit 353 and this error signal is amplified in the amplifier 354 and impressed upon the conductor 355 of the cable 352. A 570-cycle carrier wave, which is modulated with a 75-cycle reference signal of fixed phase, is also developed by the unit 353 and is impressed upon the conductor 355. The error signal is detected in the gamma ray detector channel 356 which may be substantially identical to the gamma ray detector channel 190, described in detail above in connection with Fig. 4, the output of which is impressed upon one set of input terminals of the recorder 22. The recorder 22 may be substantially the same as shown in Fig. 5 and a feedback signal, which may be either of the alternating current, direct current or pulse type, is derived from the gamma ray slide wire potentiometer in the recorder 22 and appears at the output terminal 357 thereof and is transmitted over the conductor 355 to the unit 353 in the subsurface equipment. In the unit 353, this feedback signal is employed to bring the gamma ray signal transmisison channel to a null or balance point at which no error signal is produced on the conductor 355.

In a similar manner, the signal from the neutron detector 351 is converted into a 75-cycle alternating current error signal in the unit 358, and this error signal is amplified in the amplifier 359 and transmitted over the conductor 360 of the cable 352 to the earth's surface. A 570-cycle carrier wave modulated with a 75-cycle reference signal of fixed phase is also derived from the unit 358 and is impressed upon the conductor 360. The signals appearing on the conductor 360 are detected in the neutron detector channel 361 which may be substantially identical to the neutron detector channel 200, described above in connection with Fig. 4, the output of which is connected to another set of input terminals of the recorder 22. A feedback signal, which may be either an alternating current, direct current or pulse type signal and is derived from the neutron slide wire potentiometer in the recorder 22, appears at the output terminal 362 thereof and is transmitted over the conductor 360 back to the unit 358 in the subsurface equipment wherein this feedback signal is employed to bring the neutron signal channel to a null or balance point.

In order to detect cross feed between the gamma ray and neutron signal transmission channels of the system shown in Fig. 5, it is necessary to provide some means other than frequency selective means for detecting such cross feed, since the signals present on the two conductors 355 and 360 of the cable 352 are of substantially the same frequency. In accordance with the present invention, cross feed between signal transmission channels in the system of Fig. 5 is detected by determining whether the follow-up system in each channel is brought to a complete null or balance point by the associated feedback signal. Thus, considering the gamma ray signal transmission channel and assuming that no gamma ray signal is being produced by the detector 350, if a portion of the 75-cycle neutron signal present on the conductor 360 of the neutron signal transmission channel is capacitively or otherwise coupled to the conductor 355 and impressed upon the gamma ray detector channel 356, the recorder 22 will respond to the cross fed neutron signal by adjusting the gamma ray slide wire potentiometer so that the feedback signal produced at the terminal 357 is sufficient to produce a virtual null or balance point in the gamma ray signal transmission channel. For example, if we assume that sufficient cross feed exists between the neutron and gamma ray channels to produce a 10-volt signal on the conductor 355 due to cross feed alone, and it is further assumed that this cross feed signal is of generally positive phase relative to the 75-cycle gamma ray reference signal, the gamma ray slide wire potentiometer in the recorder 22 will be adjusted so that the feedback signal at the terminal 357 is sufficient to bring the system to a virtual null point. If the gain of the amplifier 354 is one hundred, then a feedback signal of minus one-tenth volt will be sufficient to produce a minus 10-volt signal at the output of the amplifier 354 which exactly balances the cross feed signal so that a virtual null is produced on the conductor 355. However, under these conditions, a one-tenth volt error signal is produced at the input to the capacitative commutator in the unit 353 instead of providing a completely zero null point. When the gamma ray detector 359 is producing signals, these signals are added to or subtracted from the virtual null potential produced in the manner described above by cross feed from the neutron channel so that an erroneous gamma ray log will result. On the other hand, if no cross feed from the neutron channel to the gamma ray channel occurs, a 75-cycle gamma ray error signal will appear on the conductor 355 only during those periods when it is necessary to adjust the gamma ray slide wire potentiometer so as to bring the gamma ray channel to a complete null or balance point, and, during periods when the gamma ray channel is balanced, no 75-cycle error signal is produced at the input of the capacitative commutator in the unit 353. Accordingly, the presence of cross feed between the signal transmission channels of the system can be determined by determining whether or not the channel is brought to a complete null or balance point.

In order to determine when a continuous error signal is being produced by the capacitative commutator in the unit 353, which as described immediately above provides an indication of cross feed between channels, there is provided in the gamma ray channel of the system shown in Fig. 5 a linear amplifier 365, the output of which is connected to a rectifier 366 in series with a relay 367 having the normally open contacts 368. A condenser 369 is connected across the coil of the relay 367 so as to prevent this relay from responding to signals of relatively short duration which are produced in the output circuit of the amplifier 365. When the signal produced by the gamma ray detector 359 changes, a 75-cycle error signal is coupled to the input of the amplifier 365 and is rectified in the rectifier 366 so as to produce a substantially unidirectional current which flows through the relay 367. However, the action of the follow-up system in the gamma ray signal transmission channel is sufficiently rapid that a true null or balance point is reached within a very short period of time, after which no 75-cycle error signal is again produced until the signal from the detector 350 changes.

The condenser 369 is of sufficient value to prevent the relay 367 from responding to the 75-cycle error signals of short duration which are produced during the normal operation of the follow-up system. However, if cross feed exists between the nuetron and gamma ray channels, a continuous 75-cycle error signal is produced at the input of the capacitative commutator in the unit 353 and this continuous 75-cycle error signal is impressed upon the input of the amplifier 365, is amplified therein and is rectified in the rectifier 366 and impressed upon the relay 367.

The relay 367 is thus energized so that the contacts 368 thereof are closed. When the contacts 368 are closed, a 1000-cycle signal from the oscillator 370 is impressed upon the conductor 355, the ground terminal of the oscillator 370 being connected through the isolating condenser 371 to ground potential, i. e., the casing of the subsurface unit. Accordingly, when a continuous 75-cycle error signal is produced by the capacitative commutator in the unit 353, a 1000-cycle signal is impressed upon the conductor 355 and transmitted over this conductor to the earth's surface. At the surface, this 1000-cycle signal is transmitted through the band pass filter 372, is detected in the detector 373 and amplified in the amplifier 374 and the resultant output signal is impressed upon the relay 375 so as to energize the indicator lamp 376. Accordingly, whenever cross feed between the neutron and gamma ray signal channels occurs, a 1000-cycle signal is transmitted over the conductor 355 to the surface equipment wherein it is detected and amplified and used to control energization of the indicator lamp 376 so that the operator is informed that cross feed between these channels is occurring. In this connection, it will be understood that the amplifier 365, relay 367 and oscillator 370 may all be supplied with suitable operating potentials from the power supply unit in the subsurface equipment. It will also be understood that any other suitable arrangement may be employed for transmitting a unique signal over the conductor 355 in response to a continuous error signal produced by the capacitative commutator in the unit 353. Also, it will be understood that the oscillator 370 may have any suitable frequency which can be separated from the other signals on the conductor 355.

In an entirely similar manner, cross feed from the gamma ray channel into the neutron channel may be detected. Thus, a linear amplifier 380 is connected to the input of the 75-cycle capacitative commutator in the unit 358 and a rectifier 381 and relay 382 are connected to the output of the amplifier 380. An oscillator 383, which may have a frequency of 1500 cycles, for example, is employed as a cross feed indicator signal source. When a continuous error signal is produced by the capacitative commutator in the unit 358 due to cross feed from the gamma ray channel to the neutron signal conductor 360, this continuous error signal is amplified in the amplifier 380 and is rectified and impressed upon the relay 382 so as to close the contacts 384 of this relay and impress a 1500-cycle cross feed indicator signal on the conductor 360. At the earth's surface, this 1500-cycle signal is passed through the band pass filter 385, is detected in the detector 386 and amplified in the amplifier 387, the output of which is impressed upon the relay 388 so as to energize the lamp 389. Accordingly, the lamp 389 is energized during periods when cross feed from the gamma ray to the neutron signal channel is occurring.

While the above-described null detector system has been described in conjunction with a well logging system wherein the error signals in both channels are of the same frequency, it will be understood that this null detector system may equally well be employed in a well logging system wherein the error signals or reference signals are of different frequencies. Also, it will be understood that the null detector system shown in Fig. 5 may equally well be employed in a single conductor simultaneous well logging system such as described above in connection with Fig. 4 wherein error signals of different frequencies are transmitted over the same conductor together with the necessary reference signals and feedback signals to provide two complete follow-up systems.

It will be noted that the present invention is concerned with the simultaneous measurement of two quantities within the borehole, in the illustrated embodiment these quantities being natural gamma rays and artificially induced radiant energy. It should, therefore, be understood that as used in this specificiation the phrase "penetrative radiation" is intended to include all forms of natural, secondary or artificially produced or induced radiant energy or radioactivity, such, for example, as gamma rays, neutrons and the like.

While there have been described what are, at present, considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In a simultaneous penetrative radiation well logging system, the combination of, a subsurface unit for developing signals representing a plurality of radiations, a plurality of signal transmission channels connected to said subsurface unit for separately detecting said plurality of radiation signals, and signal responsive means interconnecting at least two of said channels for developing a control signal when signals normally transmitted through one of said channels are also transmitted through another of said channels.

2. In a simultaneous penetrative radiation well logging system, the combination of, a common source of signals representing radiation of two different types, said radiation signals comprising alternating current signals of two different frequencies and each having an amplitude proportional to the strength of the corresponding radiation; a pair of signal transmission channels connected to said common source, means including a band pass filter in each of said channels for transmitting a radiation signal of one frequency and normally rejecting the radiation signal of said other frequency, means in each of said channels for developing an output signal proportional to the radiation signal transmitted through the band pass filter thereof, and cross feed detector means connected to the output of at least one of said band pass filters for developing a cross feed control potential when radiation signals of said other frequency are transmitted through said one channel.

3. In a simultaneous radioactivity well logging system, means for developing a plurality of different radiation signals, a self-balancing follow-up system for each of said radiation signals, means including said follow-up systems for simultaneously logging at the earth's surface the different radiation activities in the borehole, means for developing a control potential in response to continued unbalance of one of said follow-up systems, and means responsive to said control potential for producing a signal indicative of signal cross feed between said follow-up systems.

4. In a simultaneous, radioactivity well logging system, a subsurface unit adapted to be lowered into a borehole, a plurality of radiation detectors in said subsurface unit, a self-balancing follow-up system for each of said detectors, each of said follow-up systems including means for developing a feedback signal at the earth's surface proportional to the output of one of said radiation detectors and means for transmitting said feedback signal to said subsurface unit to balance the output of said one detector, and cross feed indicator means for producing a signal indicative of signal cross feed between said follow-up systems.

5. In a simultaneous radioactivity well logging system, a subsurface unit adapted to be lowered into a borehole, a plurality of radiation detectors in said subsurface unit, a self-balancing follow-up system for each of said detectors, each of said follow-up systems including means for developing a feedback signal at the earth's surface proportional to the output of one of said radiation detectors and means for transmitting said feedback signal to said subsurface unit to balance the output of said one detector, means for developing a control signal when the output of one of said detectors is not balanced by the corresponding feedback signal, and means responsive to said control signal for producing a signal indicative of signal cross feed between said follow-up systems.

6. In a simultaneous radioactivity well logging system, a subsurface unit, a cable for lowering said unit into a borehole, a plurality of radiation detectors in said subsurface unit, a self-balancing follow-up system for each of said detectors, each of said follow-up systems including means for developing an error signal indicative of changes in the output of one of said detectors and a reference signal of fixed phase, means for transmitting said error signal and reference signal over said cable to the earth's surface and developing a feedback signal proportional to the output of said one detector, means for transmitting said feedback signal over said cable to said subsurface unit to balance the output of said one detector, means in said subsurface unit for developing a control signal when the output of said one detector is not balanced by said feedback signal and transmitting said control signal over said cable to the earth's surface, and means responsive to said control signal for producing a signal indicative of signal cross feed between said follow-up systems.

7. In a simultaneous penetrative radiation logging system, the combination of first and second pulse detector channels, means for impressing first pulses representative of first radiations on said pulse detector channel, means included in said first channel for deriving an output signal proportional to the rate of occurrence of said first pulses, means for impressing second pulses representative of second radiations on said second pulse detector channel, means included in said second channel for deriving an output signal proportional to the rate of occurrence of said second pulses, means included in each of said channels for converting pulse signals impressed upon the channel into corresponding pulses of uniform amplitude and width, a coincidence circuit, means for impressing converted pulses of uniform amplitude and width from both said channels on said coincidence circuit, and means for deriving an output signal from said coincidence circuit during periods when said impressed pulses coincide.

8. In a simultaneous penetrative radiation well logging system, the combination of, a pair of radiation detectors, means for impressing signals from both said detectors on a common load impedance, a first signal transmission channel connected to said common load impedance for developing a first logging signal proportional to the output of one of said detectors, a second signal transmission channel connected to said common load impedance for developing a second logging signal proportional to the output of the other of said detectors, and cross feed indicator means connected to both said first and second signal transmission channels for producing a cross feed indication when signals from both said detectors are simultaneously transmitted through one of said channels.

9. In a simultaneous penetrative radiation well logging system, the combination of, a common source of signals representing radiation of two different types, a pair of signal transmission channels connected to said common source for separating and detecting radiation signals of said two different types, signal responsive coincidence means interconnecting said channels for comparing signal from both said channels and producing a control signal when signals from both said channels coincide, and indicator means responsive to said control signal for producing a signal cross feed indication.

10. In a simultaneous penetrative radiation well logging system, the combination of, a common source of signals of the pulse type representing radiation of two different types, a first pulse detector channel connected to said common source for detecting only pulse signals representing radiation of a first type, a second pulse detector channel connected to said common source for detecting only pulse signals representing radiation of a second type, and pulse responsive coincidence circuit means interconnecting said channels for comparing signal pulses from both said channels and producing a cross feed indication signal when signal pulses from said first channel coincide with signal pulses from said second channel.

11. In a simultaneous penetrative radiation well logging system, the combination of, first and second pulse detector channels, means for impressing first pulses representative of a first type of radiation on said first pulse detector channel, means included in said first channel for deriving an output signal proportional to the rate of occurrence of said first pulses, means for impressing second pulses representative of a second type of radiation on said second pulse detector channel, means included in said second channel for deriving an output signal proportional to the rate of occurrence of said second pulses, and pulse responsive coincidence circuit means for comparing the pulses transmitted through both said channels and producing a cross feed indication signal when pulses transmitted through both said channels coincide.

12. In a simultaneous penetrative radiation well logging system, the combination of, a common source of pulses of one polarity representing radiation of a first type and pulses of the opposite polarity representing radiation of a second type, a first pulse detector channel connected to said common source for detecting pulses of said one polarity and producing an output signal proportional to the rate of occurrence of said pulses of one polarity, a second pulse detector channel connected to said common source for detecting pulses of said opposite polarity and producing an output signal proportional to the rate of occurrence of said pulses of opposite polarity, a coincidence circuit, means for impressing pulses from both said channels on said coincidence circuit, means for deriving an output signal from said coincidence circuit during periods when said impressed pulses coincide, and means responsive to said output signal for producing a signal cross feed indication.

13. In a simultaneous penetrative radiation well logging system, the combination of, a common source of pulses of one polarity representing radiation of a first type and pulses of the opposite polarity representing radiation of a second type, a first pulse detector channel connected to said common source for detecting pulses of said one polarity and producing an output signal proportional to the rate of occurrence of said pulses of one polarity, a second pulse detector channel connected to said common source for detecting pulses of said opposite polarity and producing an output signal proportional to the rate of occurrence of said pulses of opposite polarity, means included in each of said channels for converting pulses transmitted through the channel into corresponding pulses of uniform amplitude and width, a coincidence circuit, means for impressing converted pulses of uniform amplitude and width from both said channels on said coincidence circuit, means for deriving an output signal from said coincidence circuit during periods when said impressed pulses coincide, and means responsive to said output signal for producing a signal cross feed indication.

14. In a simultaneous penetrative radiation well logging system, a subsurface unit including a pair of radiation detectors each adapted to provide a substantially unidirectional output voltage, means for converting the output voltages of said detectors into alternating current signals of different frequencies, means including a single conductor cable for transmitting said alternating current signals over the single conductor of said cable to the earth's surface, band pass filter means at the earth's surface for normally separating said alternating currents on a frequency basis, and cross feed detector means connected to an output of said band pass filter means for developing a cross feed control potential when alternating current signals of the frequency normally attenuated by said band pass filter means are transmitted therethrough in an amount greater than a predetermined minimum value.

15. In a penetrative radiation well logging system, a subsurface unit, a cable for lowering said unit into a borehole, a radiation detector in said subsurface unit, a self-balancing follow-up system for said detector including means for developing an error signal indicative of changes in the output of said detector and a reference signal of fixed phase, means for transmitting said error signal and reference signal over said cable to the earth's surface and developing a feedback signal proportional to the output of said detector, means for transmitting said feedback signal over said cable to said subsurface unit to balance the output of said detector, means for developing a control signal in response to continued un-balance of said follow-up system, and an indicator circuit energized in accordance with said control signal.

16. In a penetrative radiation well logging system, a subsurface unit, a cable for lowering said unit into a borehole, a radiation detector in said subsurface unit, a self-balancing follow-up system for said detector including means for developing an error signal indicative of changes in the output of said detector and a reference signal of fixed phase, means for transmitting said error signal and reference signal over said cable to the earth's surface and developing a feedback signal proportional to the output of said detector, means for transmitting said feedback signal over said cable to said subsurface unit to balance the output of said detector, an oscillator in said subsurface unit adapted to develop a signal having a frequency different from said error signal, said reference signal and said feedback signal, means responsive to continued un-balance of said follow-up system for impressing a signal from said oscillator on said cable, and an indicator circuit at the earth's surface and responsive to said oscillator signal transmitted over said cable.

17. In a simultaneous penetrative radiation well logging system, a subsurface unit, a pair of radiation detectors in said subsurface unit each adapted to develop a radiation output signal, a cable for lowering said unit into a borehole, means in said unit for developing a first error signal of one frequency indicative of changes in the output signal of said first detector, means in said unit for developing a second error signal of a different frequency indicative of changes in the output signal of said second detector, means for transmitting said error signals over said cable to the earth's surface, a first filter network for separating said first error signal from the other signals on said cable, means responsive to said separated first error signal for developing a first logging signal proportional to the output of said first detector, a second filter network for separating said second error signal from the other signals on said cable, means responsive to said separated second error signal for developing a second logging signal proportional to the output of said second detector, and cross feed indicator means connected to the output of said first filter network for detecting the transmission of said second error signal through said first filter network.

References Cited in the file of this patent

UNITED STATES PATENTS

| | | |
|---|---|---|
| 1,869,515 | Shanck | Aug. 2, 1932 |
| 2,481,014 | Herzog | Sept. 6, 1949 |
| 2,499,222 | Hofstodter | Feb. 28, 1950 |
| 2,511,863 | McCoy | June 20, 1950 |
| 2,530,538 | Rack | Nov. 21, 1950 |
| 2,605,333 | Job | July 29, 1952 |
| 2,629,824 | McKay et al. | Feb. 24, 1953 |